April 11, 1944.   C. W. MOTT   2,346,321
TRACTOR-MOUNTED IMPLEMENT
Filed Aug. 20, 1941
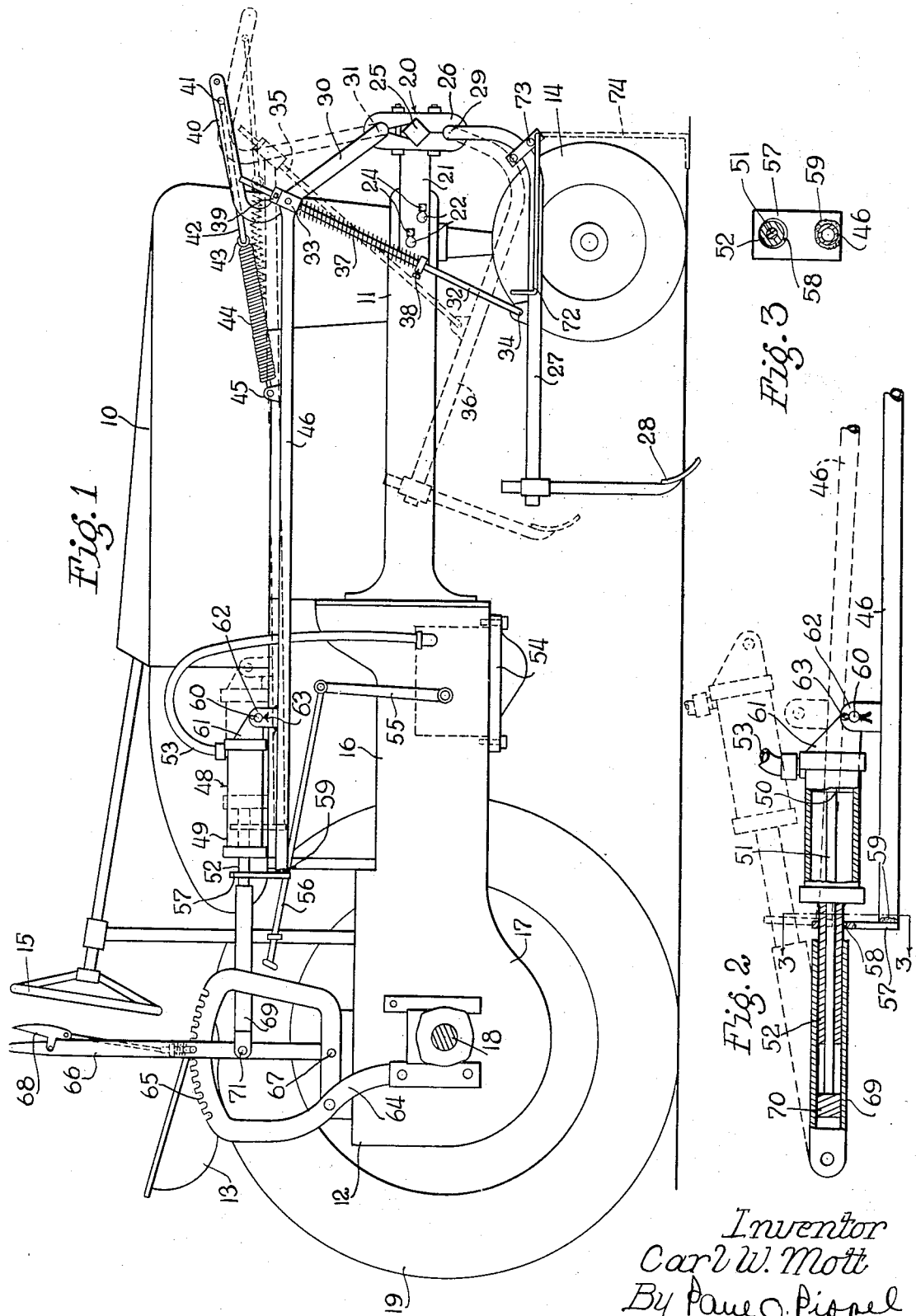
Inventor
Carl W. Mott
By Paul O. Pippel
Atty.

Patented Apr. 11, 1944

2,346,321

UNITED STATES PATENT OFFICE 2,346,321

TRACTOR-MOUNTED IMPLEMENT

Carl W. Mott, La Grange, Ill., assignor to International Harvester Company, a corporation of New Jersey Application August 20, 1941, Serial No. 407,558

14 Claims. (Cl. 97—50)

This invention relates to tractor-mounted implements and more particularly to such implements of the quick attachable type.

It is an object of the present invention to provide quick attachable means for the attachment to the implement attachment of a power-actuated device forming a part of a power means for moving the working tools of the attachment, wherein the power device may be operated from the implement attachment and adaptable for use at a location elsewhere with respect to the tractor.

It is another object of the invention to provide with the working-tool attachment a master spring arrangement which is of simple construction and so arranged with respect to the power-actuated device that it does not interfere to any great extent with the operation of the same.

It is another object of the invention wherein the master spring forming a part of the working-tool attachment will serve to maintain parts of the working-tool attachment in elevated position when the working-tool attachment is disassembled from the tractor and to thereby facilitate the attachment of the working-tool attachment to the tractor.

According to the present invention, the working-tool attachment includes the usual horizontally extending fore and aft movable lift rods adapted to move a pivoted lifting lever located forwardly on the tractor and which is in turn connected with the working-tool rig for lifting the same as the lift pipe thrusts the lever forwardly. On the rearward end of the lift pipe is provided means for removably fastening a fluid cylinder device, whereby the same may be removed from the attachment for use with other implements which can be connected to the tractor upon the present working-tool attachment being detached from the tractor. Means for connecting the fluid cylinder device to the lift pipe includes a plate with an opening through which is projected a portion of the fluid-actuated device running coextensive with the lift pipe, and the opposite end of the fluid cylinder device is connected to the pipe at a location removed from the plate by a quick attachable securing pin. The projected portion of the fluid-actuated device is connected to the rear portion of the tractor by means of a sleeve into which it is projected. This sleeve forms a part of a manually adjustable means which serves to bodily move the fluid-actuated device to effect depth adjustment of the working tool. The lifting lever located at the forward end of the tractor has a forwardly projected portion angled with respect to the main portion of the lever, and to the outer end of said portion is connected a master hold down spring which is connected at its opposite end to the longitudinally extending lift pipe at a point rearwardly of its connection with the lifting lever. This master spring has the double purpose of maintaining the fluid cylinder device in its collapsed position and as well holding the lift pipe in its horizontal position upon the workng-tool attachment being removed from the tractor, wherein the lift pipe will be in a position for easy reattachment of the working-tool attachment to the tractor.

For other objects and for a better understanding of the invention reference may be had to the following detailed description taken in connection with the accompanying drawing, in which:

Figure 1 is an elevational side view of a tractor with the implement attachment embodying the features of the present invention attached thereto;

Figure 2 is an enlarged detailed view of a fluid-actuated cylinder device attached to the lift rod of the working-tool attachment and illustrating in dotted lines the manner in which the device is assembled and disassembled from the lift rod; and Figure 3 is an end view of the lift rod and of the plate rigidly connected thereto as taken on the lines 3—3 of Figure 2.

Referring now to the drawing, there is shown a tractor 10 having a forward portion 11 and a rearward portion 12 on which is mounted an operator's station 13. The forward portion 11 of the tractor is supported on the forward wheels 14 adapted to be operated by the steering mechanism 15 accessible to the operator's station 13 on the rear portion of the tractor. Between the forward and rearward portions of the tractor is a body portion 16 which runs rearwardly into an axle housing 17 forming part of the rear portion of the tractor. Within this axle housing 17 is a rear axle 18 serving to drive a rear drive wheel 19.

Adapted for attachment to the forward portion 11 of the tractor is a ground-working tool attachment indicated generally at 20. This working-tool attachment includes an attaching plate 21 having slotted openings 22 therein adapted to fit over the heads of attaching studs 24 on the forward portion of the tractor. While only one attaching portion 21 is shown, it will be apparent that on the opposite side of the attachment there is provided a second attaching portion adapted to be similarly connected to the forward portion of the tractor. The attachment further includes a transversely extending structure or tool bar 25 which extends across the front of the tractor to locations laterally removed from the sides thereof. On this transverse tool bar 25 is connected a bracket 26 to the lower end of which is pivoted a ground-working tool rig 27 having a working tool 28 thereon. The working-tool rig 27 is pivoted to the bracket 26 as indicated at 29 and is adapted to have vertical movement to and from its ground-working position, as indicated by the dotted lines in Figure 1. On the upper end of the bracket 26 is pivoted a lifting lever 30 adapted to be pivoted vertically and in a fore and aft direction about a pivot point 31. The free end of the lifting lever 30 has connected to it a lift rod 32 by means of a trunnion 33. This lift rod is connected at its lower end to the rig 27, as indicated at 34, and as the lever 30 is moved forwardly to the dotted position shown at 35 the working-tool rig 27 will be raised to a transport position, as shown in dotted lines at 36. The lift rod 32 carries a usual pressure spring 37 which is retained against downward movement on the rod 32 by means of a collar 38. The action of this spring 36 bearing against the collar 38 is such as to place the hold down pressure on the working-tool rig 27 sufficiently to maintain the working tool 28 in its ground-working position. The rod 32 is slidable through the trunnion 33 and as the trunnion 33 engages a collar 39 on the upper end of the lift rod, the lifting operation as effected by the lever 30 will follow. The pressure spring 37 will, if the collar 39 is so set on the lift rod 32, maintain it against the trunnion 33 even when the working tool 28 is being maintained in its working position.

On the upper end of the lever 30 is formed a forwardly extending portion 40, angled with respect to the main part of the lever, which extends forwardly a considerable distance and to the outer end of which, as indicated at 41, is connected a rod 42 having connected at its rearward end, as indicated at 43, a tension spring 44. This tension spring 44 is in turn connected to a lug 45 on a horizontally extending fore and aft movable lift rod 46 which is pivotally connected at its forward end to the upper end of the lever 30. This lift rod 46 serves as a means for effecting forward pivotal movement of the lifting lever 30. The forwardly projected portion is so formed and the spring 44 is so connected to the lift pipe 46 at a point removed from its pivotal connection with the lever 30 that the tendency is for the spring to draw the upper end of the lever and the lift rod toward each other. The result of the action of the spring 44 is thus to cause rearward pivotal movement of the lever 30 and to maintain the lever in its rearward position with sufficient resistance so that the pressure spring 37 will be operative to maintain the working-tool rig 27 in its ground-working position. In other words, the spring 44 serves as a master spring against which the pressure spring 37 reacts when the working tool 28 is in its ground-working position. The lift pipe 46 extends rearwardly from the lever 30 a considerable distance to provide for the connection thereto of a single-acting power-actuated fluid cylinder device 48. By virtue of the fact that this cylinder device is operable by fluid in only one direction, it has lost motion in the opposite direction. The spring 44 serves to collapse the cylinder device.

This fluid cylinder device 48 includes a cylinder 49 and a piston 50 therein. The piston 50 has connected to it a piston rod 51 adapted to operate through a projected sleeve 52 formed on the cylinder part 50. Fluid is delivered to the fluid cylinder device by means of a hose coupling 53 adapted to receive fluid under pressure from a pump and reservoir housing 54 seated within the body portion 16 of the tractor. Projecting from the pump and reservoir housing 54 is a valve-actuating lever 55 to the upper end of which is connected a control rod 56 extending rearwardly to a location accessible to the operator's station 13. The fluid pump 54 may be operated by the tractor through gearing associated therewith in any manner well known in the art. As the control rod 56 is adjusted between a forward and rearward position, fluid will be delivered to the fluid-actuated device 48 through the hose coupling 53 or be returned through the same hose coupling 53 to the pump and reservoir housing 54.

Coming now to one of the particular features of the present invention, it will be seen that there is provided on the rear end of the lift pipe 46 a plate structure 57 having an opening 58 therethrough, as shown more clearly in plan in Figure 3. This plate 57 is rigidly secured to the rear end of the lift rod or pipe 46 by welding, as indicated at 59. The opening 58 is of sufficient diameter as to permit the projected sleeve 52 of the cylinder 49 to be projected therethrough and to retain the same against lateral movement. Once the sleeve portion 52 is projected through the opening 58 the cylinder device 48 is retained against longitudinal movement by a pin 60 adapted to extend respectively through openings within a connecting portion 61 on the cylinder part 49 of the fluid cylinder device 48 and on the lugs 62 rigidly secured to the lift pipe 46. Once the pin 60 has been inserted the same is retained within these openings by means of a cotter pin 63. It should now be apparent that there has been provided by means of the opening 58 and the plate structure 57 and by means of the pin 60, means for quickly attaching the fluid-actuated cylinder device 48 to the lift rod 46 which forms a part of the working-tool attachment 20.

On the portion of the rear axle housing 17, which extends laterally to house the rear axle 18, there is connected a bracket structure 64 which extends vertically and has on its upper end a quadrant structure 65 over which is actuated an adjusting lever 66 pivoted to the bracket structure, as indicated at 67. This lever 66 has the usual detent mechanism 68 for retaining the lever in its adjusted position over the quadrant 65. Pivotally connected to the lever for vertical movement is a pipe sleeve 69 adapted to receive the sleeve portion 52 of the fluid cylinder 49. Within this sleeve is a stop 70 against which the rearward end of the piston rod 51 will bear. Since the sleeve 69 is pivoted as at 71 to the lever 66 for vertical movement, it will be apparent that the same can be readily manipulated vertically to receive the projecting parts of the fluid cylinder device as the same are projected through the opening 58 in the plate 57, see illustration shown in Figure 2. The quadrant and lever mechanism being rigidly connected to the tractor serve as a reaction point against which the fluid cylinder device reacts and at the same time serves as a manual adjusting means to adjust the working depth of the working tool 28. When the fluid cylinder device 48 is attached to the lift pipe 46, it becomes for all practicable purposes a part of the working tool attachment 20. It should now be apparent, however, that by the means just defined the fluid-actuated device 48 may be readily detached from the lift pipe 46 by a process equally as simple as the process of connecting the same thereto, whereby the fluid cylinder device may be freed of the implement attachment as the same is detached from the tractor for the attachment to the tractor of other types of working-tool attachments. This leaves the fluid-actuated device 48 assembled for use with the other working-tool attachments.

As fluid is directed through the hose coupling 53 to the fluid-actuated device 48, the cylinder part 49 and the lift pipe 46 are thrust forwardly to pivot the lifting lever 30. The piston rod 51 will react against the stop 70 within the sleeve 69. This forward movement is resisted, however, by the tension spring 44, though, due to the angle of the projected portion 40 with respect to the main portion of the lever 30 tending to pull the spring toward dead center position, the resistance of the spring to the movement of the fluid cylinder device reduces as the forward movement of the cylinder device takes place. The spring 44 thus has its maximum pull when the lifting lever 30 is in its rearward position and the working tool 28 is in its ground-working position.

When it is desired to detach the working-tool attachment from the tractor, the stud bolts 24 are loosened or removed thereby permitting a rearward movement of the tractor. Before this rearward movement takes place a supporting rod 72 pivoted to the ring, as indicated at 73, is rotated downwardly to the position 74 shown in dotted lines in Figure 1. This supporting rod thus forms a support for the forward part of the working-tool attachment. As the attachment is removed by the rearward movement of the tractor, the attachment is kept from collapsing by the lifting rod 32 connected between the lifting lever 30 and the rig 27. The fluid-actuated device 48 is then detached from the lift rod 46 leaving the rearward end of the lift rod 46 free. It will be noted that in the absence of any means such as the spring 44 the tendency of the lift rod 46 would be to pivot downwardly toward the ground. This, however, is prevented by the tension spring 44, and thus the rod 46 will be maintained in its horizontal position even when the working-tool attachment is detached from the tractor. It should thus now be apparent that this attaching spring 44 serves the double purpose of acting as a master spring and as a means for retaining the lift rod in its horizontal position when the working-tool attachment is detached from the tractor.

While various changes may be made in the detail construction, it shall be understood that such changes shall be within the spirit and scope of the present invention, as defined by the appended claims.

What is claimed is:

1. In combination, a tool-supporting frame, a working tool connected to the tool-supporting frame for movement with respect thereto, power means for moving the working tool including a power-actuated device, movable parts for connecting the power-actuated device to the working tool, at least one of said parts being an elongated rod and having on one end thereof a plate with an opening therethrough running parallel with the rod, said power-actuated device having a part adapted to extend through the opening for connection to said frame and to be therein retained against lateral movement while at the same time being slidable with respect thereto upon being attached, means for easily fastening the power device elsewhere on the elongated rod to retain the same against sliding movement, whereby said power-actuated device is quickly removable from the movable parts and free for use at other locations on the supporting frame.

2. In combination, a tool-supporting frame, a working tool connected to the tool-supporting frame for movement with respect thereto, power means for moving the working tool including a power-actuated device, movable parts for connecting the power-actuated device to the working tool, at least one of said parts being an elongated rod and having on one end thereof a plate with an opening therethrough running parallel with the rod, said power-actuated device having a part adapted to project through the opening for connection to the supporting frame and to be therein retained against lateral movement while at the same time being slidable with respect thereto upon being attached, means for removably connecting the projected part of the power-actuated device with the supporting frame including a sleeve adapted to receive the projected part wherein the power device will in turn be steadied against lateral movement with respect to said frame, means for removably fastening the power device elsewhere on the elongated rod, whereby said power device becomes substantially integral with the movable parts and serves as a means for the connecting of said parts with the supporting frame.

3. In combination, a tractor having forward and rearward portions, a ground-working tool attachment mounted on the forward portion of the tractor including a tool having vertical movement to and from its ground-working position and a rearwardly extending fore and aft movable lift rod, an operator's station mounted on the rearward portion of the tractor, an adjustable stop device on the rearward portion and including an adjusting lever accessible to the operator's station and a vertically pivotable sleeve, fluid power means operated by the tractor for moving the tool and including a fluid cylinder device having a projected portion thereon, said lifting rod having on its rearward end a structure with an opening therethrough running parallel with the rod to retain the projected portion of the fluid cylinder device, said projected portion being adapted to fit within the sleeve of the adjustable stop device upon the device being assembled to the lift rod, and means for releasably securing the device against longitudinal displacement with respect to the lift rod, whereby said fluid cylinder device is removably secured to the ground-working tool attachment and at the same time is bodily adjustable to effect depth adjustment of the working tool.

4. In combination, a supporting frame, a working-tool attachment for the supporting frame including a working-tool rig adapted to have vertical movement to and from its working position, a vertically swingable lever on the attachment and connected to the tool rig to lift the same when swung by means acting upon the lever, an expansible and collapsible force-exerting means on said supporting frame, an operating linkage for transmitting operating force from said force-exerting means to said rig and including said lever and a link pivotally connected in angular relation with the lever at a point in spaced relation to its fulcrum, said link and lever changing their angularity in one direction to modify the length of the linkage as force is transmitted thereby to the rig from the force-exerting means as the latter expands, and biasing means connected between said lever and link for exerting a force therebetween tending to change their angularity in the opposite direction to modify the length of the linkage and to collapse the force-exerting means.

5. In combination, a tractor, a ground-working tool attachment for the tractor including a ground-working tool rig adapted to have vertical movement to and from its ground-working position, a vertically swingable lever mounted on the attachment for fore and aft movement and connected to the working-tool rig to lift the same when swung by means acting upon the lever, fluid power means for lifting the working-tool rig including a single acting fluid cylinder device comprising a force transmitter movable in one direction upon energization of the device and retractable in the opposite direction when the device is deenergized, a link interconnecting the force transmitter and lever and pivotally connected with the latter for pivoting the same upon movement of the force transmitter in the one direction, and biasing means reacting between said lever and said link for manipulating the latter to retract the force transmitter upon deenergization of the device.

6. In combination, a supporting frame, a working-tool rig, a lifting lever connected to the working-tool rig, means for connecting the working-tool rig and the lifting lever to the supporting frame for vertical swinging movement, power means for lifting the working-tool rig including a power-actuated device having a thrust rod connected to the free end of the lever to act upon the same in one direction, said power device having a lost motion in the opposite direction, said lever having on its free end a projection running ahead of the connection of the thrust rod therewith, biasing means extending between the thrust rod and the projection to take up the lost motion of the power device, the arrangement of the thrust rod, the lever with its projection, and the biasing means being such that as the power device is actuated to lift the working tool rig the biasing effect of the biasing means is reduced.

7. In combination, a tractor having a forward portion, a ground-working tool attachment adapted to be connected to the forward portion of the tractor, and including a frame member and a ground-working tool rig and a lifting lever pivoted on the frame member for vertical movement, fluid power means for lifting the working-tool rig including a single acting fluid cylinder device having a thrust rod connected to the free end of the lever to pivot the same in one direction, said lever having on its free end a forwardly extending projection, spring biasing means extending between the thrust rod and the projection and tending to collapse the cylinder device, the arrangement of the thrust rod, the lever with its forwardly extending projection and the biasing means being such that as the cylinder device is expanded to lift the working tool rig the biasing effect of the biasing means is reduced.

8. In combination, a tool-supporting frame, a working-tool attachment adapted to be removably attached to the tool-supporting frame as a unit, said tool attachment including an attaching structure, a working-tool rig and a pivotal lever respectively connected to the structure for vertically pivotable movement, means for connecting the tool rig and pivotal lever together, said connecting means serving as a support for the lever upon removal of the attachment from the tool-supporting frame, a horizontally extending part pivotally connected to the lever and adapted to receive for the attachment power from a power-actuated device, and means forming a part of the attachment serving to support the horizontal part when the tool attachment is removed from the tool-supporting frame, whereby said horizontal part will be retained in position for easy attachment of the working-tool attachment to the tool-supporting frame.

9. In combination, a tool-supporting frame, a working-tool attachment adapted to be removably attached to the tool-supporting frame as a unit, said tool attachment including an attaching structure, a working-tool rig and a pivotal lever respectively connected to the structure for vertically pivotable movement, means for connecting the tool rig and pivotal lever together, said connecting means serving as a support for the lever upon removal of the attachment from the tool-supporting frame, a horizontally extending part pivotally connected to the lever and adapted to receive for the attachment power from a power-actuated device, and means in cooperative relation between the horizontal part and the lever for supporting the horizontal part when the tool attachment is removed from the tool-supporting frame, whereby said horizontal part will be retained in position for easy attachment of the working-tool attachment to the tool-supporting frame.

10. In combination, a tool-supporting frame, a working-tool attachment adapted to be removably attached to the tool-supporting frame as a unit, said tool attachment including an attaching structure, a working-tool rig and a pivotal lever respectively connected to the structure for vertical pivotable movement, means for connecting the tool rig and pivotal lever together, said connecting means serving as a support for the lever upon removal of the attachment from the tool-supporting frame, a part connected to the lever and adapted for the connecting of a power-actuated device to the tool attachment, biasing means located between said part and the lever, and said biasing means being so connected and arranged as to serve as a support for said part, whereby said part will be retained in position for easy attachment of the working-tool attachment to the tool-supporting frame.

11. In combination, a tractor having a forward portion adapted for the attachment thereto of a ground-working tool attachment, a ground-working tool attachment adapted to be removably attached to the forward portion of the tractor, said tool attachment including an attaching structure, a working-tool rig and a pivotal lever respectively connected to the attaching structure for vertically pivotable movement, a lift rod extending between the lever and the tool rig and having a pressure spring means thereon adapted to react against the lever, said rod and spring means serving as a support for the lever upon removal of the attachment from the tractor, power means for lifting the working-tool rig and including a power-actuated device having lost motion in one direction but operable in a forward direction to pivot the pivotal lever, a rearwardly and horizontally extending rod part connected to the pivotal lever and serving as a means for the connection of the power-actuated device to the working-tool attachment, biasing means connected between the said horizontally extending rod part and the pivotal lever to take up the lost motion of the power-actuated device so as to fix the lever so that it may serve as a stop against which the pressure spring means may react, and said biasing means so connected and arranged as to serve as means for supporting the horizontally extending rod part when the attachment is removed from the tractor, whereby said latter part will be retained in position for easy attachment of the ground-working tool attachment to the tractor.

12. In an implement detachably associatable with a draft vehicle therefor having expansible force-exerting means for operating the implement, the combination of a frame structure, an adjustable tool rig connected with said frame structure in a manner contributing to the support thereof when the implement is detached from said vehicle, a pivoted structure connected with said frame structure for pivotal movement about a generally horizontal axis and including a spring anchorage extension projecting therefrom transversely of said axis, means operably connecting the pivoted structure with the tool rig to cause adjustment of the same upon the pivoting of such structure, an operating member pivotally connected with the pivoted structure on the side of said axis with the spring anchorage extension and projecting generally oppositely from said extension but forming therewith an obtuse angle facing generally upwardly, said operating member being disposable in force-receiving relation with the vehicle force-exerting means for actuation thereby to pivot the pivoting structure when the implement is attached to the vehicle, and a contraction spring connected between said operating member and said anchorage extension in subtending relation with said angle formed thereby to resist dropping of said member about its pivotal connection with the pivoted structure.

13. In an implement detachably associatable with a draft vehicle therefor having expansible force-exerting means for operating the implement, the combination of a frame structure detachably connectable with such vehicle, an adjustable tool rig connected with said frame structure in a manner contributing to the support thereof when said frame structure is detached from the vehicle, a pivoted structure connected with said frame structure for pivotal movement about an axis, means operably connecting the pivoted structure with the tool rig to cause adjustment of the same upon the pivoting of such structure, an operating member pivotally connected with the pivoted structure at a point removed from said axis wherefore bodily movement of said member transversely of said axis will impart pivotal movement to the pivoted structure for adjusting the tool rig, said operating member being connectable with the vehicle force-exerting means and bodily movable as aforesaid thereby upon the applying of a force to said member pursuant to an expansion of said force-exerting means and incident to incurring a relative angular displacement of said operating member and said pivoted structure about the pivoted connection between this member and structure, said operating member being also bodily movable to collapse the expansible force-exerting means upon retrograde angular displacement of said member and pivoted structure, and biasing means connected between the last-mentioned member and structure and acting thereon in a direction tending to produce said retrograde displacement.

14. In an implement detachably associatable with a draft vehicle therefor having expansible force-exerting means for operating the implement, the combination of a frame structure detachably connectable with the vehicle to support said implement thereon, an adjustable tool rig connected with said frame structure in a manner contributing to the support thereof when said frame structure is detached from the vehicle, a pivoted structure connected with said frame structure for pivotal movement about a generally horizontal axis, means operably connecting the pivoted structure with the rig to cause adjustment of the same upon the pivoting of such structure, a generally horizontally extending operating member pivotally connected with the pivoted structure for relative pivotal movement about a generally horizontal axis at a point removed from the first-named axis so that endwise movement of said member in one direction will impart pivotal movement to the pivoted structure for adjusting the tool rig, said operating member being connectable with the vehicle force-exerting means, when so horizontally extended, to be moved endwise as aforesaid thereby upon the application of a force to said member pursuant to an expansion of said force-exerting means and incident to incurring a relative angular displacement of said operating member and said pivoted structure about the pivoted connection between this member and structure, said operating member being movable endwise in the opposite direction to collapse the expansible force-exerting means upon retrograde angular displacement of said member and pivoted structure, and biasing means connected between the last-mentioned member and structure and acting thereon in a direction tending to produce said retrograde displacement and to resist downward displacement of said member from its horizontal position in which it is connectable with the force-exerting means.

CARL W. MOTT.